United States Patent
Ricordeau et al.

(10) Patent No.: US 10,662,960 B2
(45) Date of Patent: May 26, 2020

(54) SUPPLY OF AIR TO AN AIR-CONDITIONING CIRCUIT OF AN AIRCRAFT CABIN

(71) Applicant: SAFRAN AIRCRAFT ENGINES, Paris (FR)

(72) Inventors: Julien Alexis Louis Ricordeau, Paris (FR); Marc Missout, Montigny le Bretonneux (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 594 days.

(21) Appl. No.: 15/457,773

(22) Filed: Mar. 13, 2017

(65) Prior Publication Data

US 2017/0284408 A1 Oct. 5, 2017

(30) Foreign Application Priority Data

Mar. 14, 2016 (FR) .................................. 16 52122

(51) Int. Cl.
  *B64D 13/02* (2006.01)
  *F04D 27/00* (2006.01)
  (Continued)

(52) U.S. Cl.
  CPC .......... *F04D 27/004* (2013.01); *B64D 13/02* (2013.01); *B64D 13/06* (2013.01); *B64D 27/10* (2013.01);
  (Continued)

(58) Field of Classification Search
  CPC . B64D 2013/0644; B64D 13/02; B64D 13/04
  See application file for complete search history.

(56) References Cited

U.S. PATENT DOCUMENTS 7,168,913 B2  1/2007 Lardellier
8,484,977 B2  7/2013 Bader et al.
(Continued)

FOREIGN PATENT DOCUMENTS

EP   1 541 834 A1  6/2005
FR   2 934 321 A1  1/2010
WO   2015/114265 A1  8/2015

OTHER PUBLICATIONS

French Search Report dated Oct. 27, 2016, issued in corresponding French Application No. 1652122, filed Mar. 14, 2016, 8 pages.

*Primary Examiner* — Kayla McCaffrey
(74) *Attorney, Agent, or Firm* — Christensen O'Connor Johnson Kindness PLLC

(57) ABSTRACT

An aircraft turboprop engine has at least one low-pressure body and one high-pressure body. The low-pressure body drives a thrust propeller using a gearbox. The turboprop engine further includes a means for supplying air to an air-conditioning circuit of an aircraft cabin. The supply means includes a load compressor and a rotor that is coupled to the low-pressure body by the gearbox. The supply means further includes a means for controlling the rotation speed of the rotor of the compressor, which means comprise an electric motor, and a mechanical differential for coupling a first output shaft of said electric motor to a second output shaft of said gearbox and to said compressor rotor, such that the rotation speed of said rotor depends on the respective rotation speeds of said first and second output shafts.

10 Claims, 3 Drawing Sheets

(51) Int. Cl.

| | | |
|---|---|---|
| *F02C 7/32* | (2006.01) | |
| *B64D 13/06* | (2006.01) | |
| *B64D 27/10* | (2006.01) | |
| *F02C 6/20* | (2006.01) | |
| *F02C 7/36* | (2006.01) | |
| *F04D 25/02* | (2006.01) | |
| *F04D 25/06* | (2006.01) | |

(52) U.S. Cl.
 CPC ............... *F02C 6/206* (2013.01); *F02C 7/32* (2013.01); *F02C 7/36* (2013.01); *F04D 25/028* (2013.01); *F04D 25/06* (2013.01); *B64D 2013/0644* (2013.01); *F05D 2260/40311* (2013.01); *Y02T 50/56* (2013.01)

(56) References Cited

U.S. PATENT DOCUMENTS

| | | | |
|---|---|---|---|
| 9,163,562 B2* | 10/2015 | Suciu | F01D 15/08 |
| 2013/0040545 A1* | 2/2013 | Finney | B64D 13/06 |
| | | | 454/71 |
| 2015/0275769 A1* | 10/2015 | Foutch | F02C 9/18 |
| | | | 60/776 |
| 2016/0332736 A1 | 11/2016 | Parmentier et al. | |

* cited by examiner

SUPPLY OF AIR TO AN AIR-CONDITIONING CIRCUIT OF AN AIRCRAFT CABIN

TECHNICAL FIELD

The present invention relates to the supply of air to an air-conditioning circuit of a cabin of an aircraft that is equipped with at least one turboprop engine.

PRIOR ART

On board an aircraft, air needs to be available in order to be able to perform certain functions, such as air-conditioning in the pilot cabin and the passenger cabin or de-icing of certain aircraft components. At high altitudes, oxygen rarefies and the air pressure drops. This means that the aircraft cabins need to be pressurised in order to ensure the comfort and the survival of the passengers during a flight. To this end, air having a minimum pressure level (generally between 0.8 and 1 bar) and a controlled temperature (regulatory requirement) must be supplied to the air-conditioning circuit. Therefore, an aircraft is equipped with an air-conditioning circuit that is supplied by the one or more engines of the aircraft, which are turboprop engines within the scope of the invention.

Typically, a turboprop engine comprises at least one low-pressure body and one high-pressure body, the low-pressure body driving a thrust propeller by means of a gearbox or reduction gearbox, commonly referred to as PGB (Power Gear Box). The low-pressure body comprises a turbine rotor connected by a shaft to the propeller and optionally to a compressor. Each other body comprises a compressor rotor connected by a shaft to a turbine rotor.

In the prior art, the air-conditioning circuit is supplied with bleed air from one of the compressors of the turboprop engine. However, this has disadvantages, the most significant of which are as follows:
- the pressure of the air supplied to the aircraft significantly exceeds the demand, particularly during the aircraft climbing phase, which requires protection devices in the event of overpressure and the air ducts being dimensioned accordingly;
- the bleed air temperature in the region of the compressor significantly exceeds the regulatory requirement (maximum temperature upon passage into the fuel zones), which requires a cooling device (generally referred to as precooler), which is difficult to integrate in the nacelle, before sending the air into the circuit of the aircraft;
- considerable energy is lost, which penalises the consumption and the efficiency of the turboprop engine;
- the pressure in the compressor drops at idle power, which requires either raising the idle power level of the turboprop engine in order to have enough pressure in the circuit or bleeding air from two points on the compressor, which requires two bleed ports and as many valves to switch air bleeding from one port to the other, which is relatively complex. In both cases, this leads to an overconsumption of fuel at idle power;
- when the bleed air flow is excessive, which occurs in certain turboprop engine operating phases, bleed air is discharged, i.e. it is generally expelled and released in the nacelle of the turboprop engine in order to reduce the flow of bleed air, which is particularly noisy.

Solutions to this problem have already been proposed. A particular proposal has been to supply a conditioning circuit with bleed air from an auxiliary heat engine of the APU (Auxiliary Power Unit) type mounted in the aircraft. However, the operation of this engine is optimised on the ground and therefore is not efficient at altitude. Its use, with the exception of an engine malfunction, involves additional fuel consumption compared to the preceding technique. Furthermore, not all aircraft are equipped with an engine of the APU type.

It has also been proposed for the aircraft to be equipped with a dedicated compressor (to supply air to the cabin) driven by the gearbox for driving the accessory equipment of the engine, generally referred to as AGB (Accessory Gear Box). This accessory gearbox is coupled to the high-pressure body of the turbine engine. Air is supplied by a dedicated compressor for supplying the cabin with air and is not bled either from a compressor of the turboprop engine, which is less detrimental to performance. However, this solution is unsatisfactory as the rotation speed of the high-pressure body varies excessively depending on the operating conditions such that the rotation speed of the rotor of the dedicated compressor will be too low at idle power for this compressor to be able to supply an air flow to the conditioning circuit at the minimum required pressure.

A further solution involves driving the dedicated compressor using an electric motor. However, this solution is also unsatisfactory as it involves a loss of efficiency due to the conversion of mechanical energy into electric energy by the electric generator intended to be driven by the PGB or the AGB and to supply the electric motor with power, and due to the conversion of electric energy into mechanical energy by the dedicated compressor.

In the document FR-A1-3 017 159, the Applicant has proposed a further solution that involves coupling the dedicated compressor to the low-pressure body by means of the power gearbox (PGB). The compressor is coupled to the gearbox using a fixed reducing ratio. This is particularly advantageous in terms of specific consumption. Furthermore, when the turboprop engine is configured so that the rotation speed of its low-pressure body adheres to a discrete speed rule, i.e. each speed is constant per step. The speed of the propeller can be within a fairly limited range as it can no longer be operational if it slows down excessively. The rotation speed of the low-pressure body is in particular constant during the same flight phase. A flight phase is understood to be a phase during which the aircraft completes a single type of manoeuvre. Therefore, the rotation speed of the rotor of the dedicated compressor will not depend on the operating conditions and the dedicated compressor can supply the conditioning circuit with an air flow at the minimum required pressure, even at idle power. Furthermore, it is no longer necessary for at least two air bleed ports to be provided on the compressor, as well as the associated valves, which is simpler.

The present invention proposes an improvement to this latest technology, which is simple, efficient and economical.

DISCLOSURE OF THE INVENTION

The invention proposes an aircraft turboprop engine, comprising at least one low-pressure body and one high-pressure body, the low-pressure body driving a thrust propeller by means of a gearbox, the turboprop engine further comprising means for supplying air to an air-conditioning circuit of an aircraft cabin, said supply means comprising a load compressor, a rotor of which is coupled to said low-pressure body by means of said gearbox, characterised in that said supply means further comprise means for controlling the rotation speed of the rotor of said compressor, which means comprise:
- an electric motor; and
- a mechanical differential for coupling a first output shaft of said electric motor to a second output shaft of said gearbox and to said compressor rotor, such that the rotation speed of said rotor depends on the respective rotation speeds of said first and second output shafts.

Therefore, the invention proposes a hybrid solution for driving the load compressor rotor, namely using the gearbox and the electric motor.

A first advantage of the invention is that the air-conditioning circuit can be supplied with air when the low-pressure body is not rotating or is hardly rotating, for example in the off mode. The electric motor then simply needs to be controlled such that the rotation speed of its output shaft imposes a rotation speed on the load compressor rotor depending on the desired air flow for supplying the circuit.

A further advantage of the invention is the possibility of controlling this air flow. Indeed, the air flow demand is not in line with the progression of the engine speed. The load compressor is generally dimensioned for a particular operating point, which means that it is mainly oversized for most of the other operating points. The result is mechanical take-off by the load compressor which is greater than the actual demand and which results in significant and uncontrolled fuel consumption.

The invention further makes it possible to not oversize the compressor in order to limit the bleed air flow to the demand only, and to not have to discharge the bleed air in the event of excessive air flow. This is particularly advantageous as this allows the discharge valves of the prior art to be dispensed with, which valves are heavy and bulky, and thus prevents the release of hot air discharged into the nacelle of the turboprop engine.

These advantages are facilitated by the fact that the rotation speed of the load compressor rotor is controlled by the motor. The compressor rotor is driven by the mechanical differential having two inputs respectively connected to the first and second shafts (of the electric motor and of the gearbox) and one output connected to the compressor rotor.

The turboprop engine according to the invention can comprise one or more of the following features, taken in isolation or in combination with each other:
- said mechanical differential is integrated in said gearbox;
- said electric motor is integrated in said gearbox or is mounted on said gearbox;
- said control means comprise means for measuring the rotation speed of said second output shaft and means for controlling the rotation speed of said first shaft depending on a desired air flow for supplying said circuit;
- said control means comprise means for measuring the rotation speed of said first output shaft;
- said differential comprises a central sun gear connected to said second output shaft or formed by said second output shaft, an outer ring that extends around the central sun gear and is connected to said first output shaft or formed by said first output shaft, and satellite gears that are respectively meshed with said central sun gear and said outer ring and are supported by a satellite carrier connected to said rotor or forming said rotor;
- the control means comprise a further electric motor forming a redundancy.

The present invention further relates to a method for supplying air to an air-conditioning circuit of a cabin of an aircraft that is equipped with at least one turboprop engine as previously described, comprising a first step consisting in:
- rotating said first shaft in a direction opposite that of said second shaft, such that the rotation speed of said rotor (61) is less than that of said second shaft, during at least one operating phase of the turboprop engine, such as upon aircraft take-off.

The method may comprise a step consisting in:
- rotating said first shaft in one direction, while the rotation speed of said second shaft is substantially zero, during at least one operating phase of the turboprop engine, such when in the aircraft off mode or hotel mode.

The method may comprise a step consisting in:
- not rotating said first shaft, the rotation speed of said second shaft imposing a rotation speed on said rotor, during at least one operating phase of the turboprop engine, such as at idle power.

DESCRIPTION OF THE DRAWINGS

The invention will be better understood and further details, features and advantages of the invention will become apparent upon reading the following description, given by way of non-limiting example and with reference to the accompanying drawings, in which.

DETAILED DESCRIPTION

Figure 1:
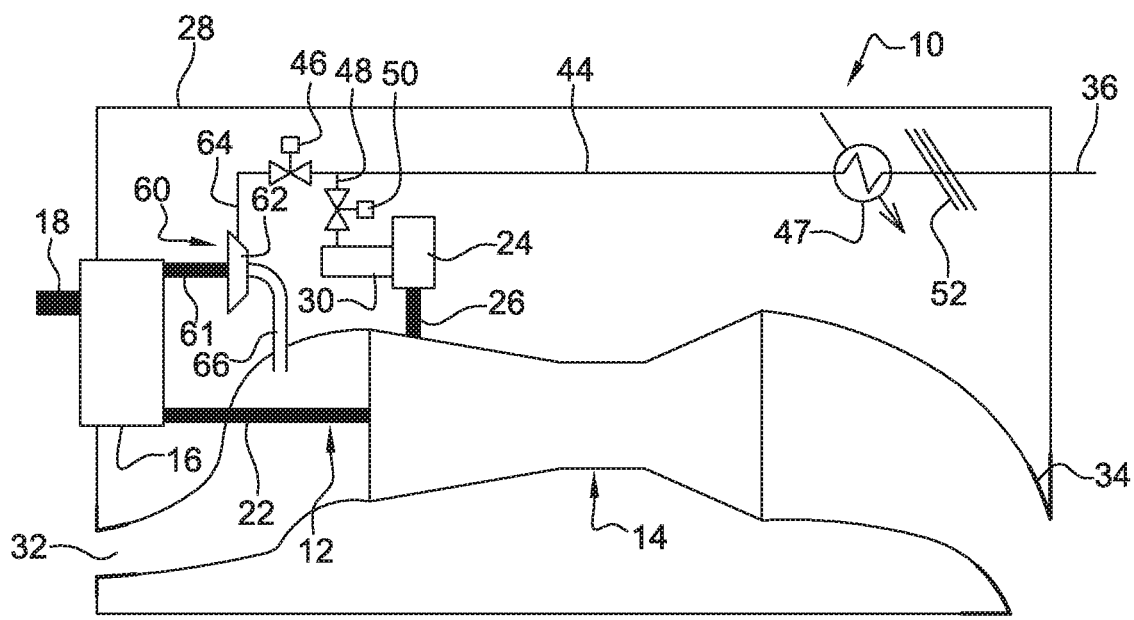
FIG. 1 is a highly schematic view of an aircraft turboprop engine and shows means for supplying air to an air-conditioning circuit of an aircraft cabin.

FIG. 1 shows an aircraft turboprop engine 10, which herein is of the twin-spool type and comprises a low-pressure body 12 and a high-pressure body 14. The low-pressure body 12 drives a thrust propeller by means of a gearbox 16 or reduction gearbox, commonly referred to as PGB (Power Gear Box). Only the shaft 18 of the thrust propeller is shown in FIG. 1.

The low-pressure body 12 herein comprises only a turbine rotor connected by a shaft to the gearbox 16. The high-pressure body 14 comprises a compressor rotor connected by a shaft to a turbine rotor. The shaft of the high-pressure body 14, referred to as HP shaft, is tubular, and the shaft of the low-pressure body 12, referred to as LP shaft or power shaft, passes coaxially through said HP shaft. The LP shaft comprises a gear (not shown) at one end that is coupled to the shaft 18 of the thrust propeller by means of a series of gears of the gearbox 16.

The turboprop engine 10 comprises a gearbox 24 (referred to as AGB "Accessory Gear Box") for driving accessory equipment, which gearbox is coupled to the high-pressure body 14 of the turbine engine, and in particular to the HP shaft, by means of a radial shaft 26. The accessory gearbox 24 is mounted in the nacelle 28 of the turboprop engine 10 and is schematically shown by a rectangle.

The accessory gearbox 24 supports and drives a plurality of items of equipment, among which is a pneumatic starter 30, which, as its name suggests, is intended to start the turboprop engine 10 by rotating its high-pressure body by means of the accessory gearbox 24 and the radial shaft 26.

The turboprop engine 10 further comprises an air inlet 32 for supplying the engine with air and an exhaust pipe 34 for the combustion gases. The turboprop engine 10 further comprises a combustion chamber between the LP and HP compressors, on the one hand, and the HP and LP turbines, on the other hand.

The turboprop engine 10 is further equipped with means 36 for supplying air to an air-conditioning circuit of an aircraft cabin.

In the prior art, these air supply means comprise air bleed means in the engine of the turboprop engine 10.

The Applicant has already proposed equipping the turboprop engine with a dedicated compressor, referred to as load compressor 60, the rotor 61 of which is coupled to the low-pressure body and in particular to the LP shaft 22 of the engine by means of the gearbox 16.

Figure 2:
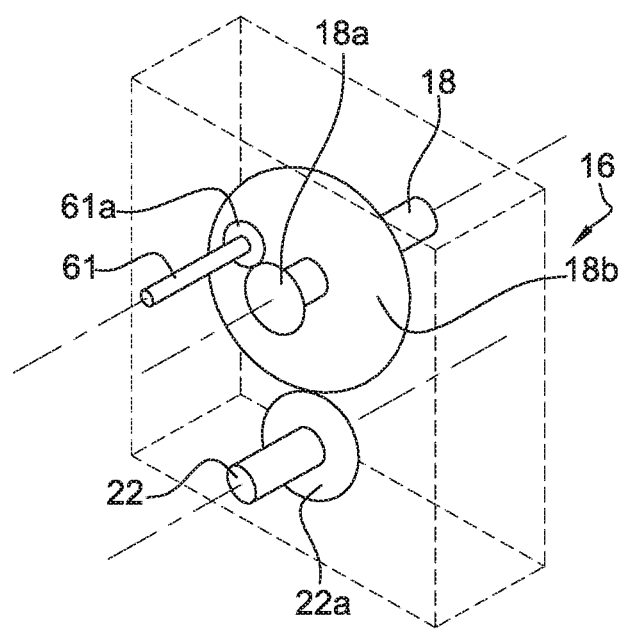
FIG. 2 is a highly schematic view of a gearbox for driving the dedicated compressor of the air supply means.

As is schematically shown in FIG. 2, the shaft of the rotor 61 of the compressor 60 can support a gear 61a meshed with a gear 18a of the shaft 18 of the propeller of the turboprop engine 10, this shaft 18 supporting a further gear 18b meshed with a gear 22a of the LP shaft 22. The gears 18a, 18b, 22a, 61a are housed in the gearbox 16.

The compressor 60 comprises an air inlet 62 and an air outlet 64. In the example shown, the air inlet 62 is connected by a line 66 to the air inlet 32 jacket of the turboprop engine 10, i.e. to the portion of the turboprop engine 110 extending between the air inlet 32 and the inlet of the turbine engine 14. Relatively fresh air is thus bled by the line 66 to supply the compressor 60. It is advantageous for fresh air to be bled so that it does not have to be cooled before it is sent to the aircraft. Otherwise, bleed air from the compressor of the high-pressure or low-pressure body, which has undergone several successive compressions and which is thus heated up, would be too hot.

The air outlet 64 of the compressor 60 is connected to the duct 44 for supplying air to the circuit 36. This duct 44 comprises a valve 46, which controls the supply pressure of the circuit 36, and a heat exchanger 47 of the precooler type, which is intended to lower the air temperature before it is introduced into the circuit 36. The duct 44 is also connected by a line 48 equipped with a valve 50 to an air inlet of the pneumatic starter 30.

The compressor 60 can be any type of compressor and is, for example, an axial compressor having one or more stages or a centrifugal compressor having one or more stages or even a combined compressor comprising one or more axial stages and one or more centrifugal stages or a spiro-axial compressor. It is also conceivable to use more than one load compressor and, for example, two load compressors mounted in series.

After starting the turboprop engine 10, the low-pressure body 12 and its shaft 22 generally rotate at a substantially constant speed. The rotor of the compressor 60 is rotated at a substantially constant speed, which in particular depends on the reduction coefficient of the gearbox 16, 80. The rotation of the rotor shaft 61 of the compressor 60 causes air to be sucked and bled by the line 66, 68, 72 up to the air inlet 62 of the compressor 60. This air is then compressed by the compressor 60, which supplies the duct 44 with compressed air at a predetermined pressure. The valve 46 controls the supply pressure of the circuit 36. The heat exchanger 47 allows the air temperature to be decreased before it is introduced into the circuit 36 (FIG. 6a), before it is introduced into the compressor (FIG. 6c) or between two compression phases (FIG. 6b). Regardless of the operating conditions of the turboprop engine 10, the rotor shaft 61 of the compressor 60 rotates at a constant speed if the rotation speed of the low-pressure body 12 is also constant.

Figure 3:
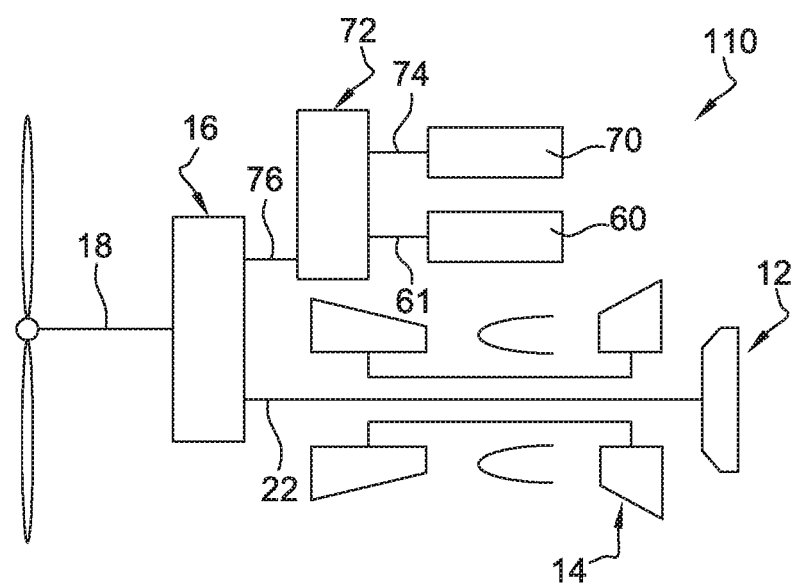
FIG. 3 is a highly schematic view of an aircraft turboprop engine and shows means for supplying air to an air-conditioning circuit of an aircraft cabin, according to the invention.

The turboprop engine 110 of FIG. 3 illustrates the invention. This turboprop engine 110 differs from that previously described in that it further comprises means for controlling the rotation speed of the rotor shaft 61 of the compressor 60.

The control means comprise an electric motor 70 and a mechanical differential 72. The mechanical differential 72 allows an output shaft 74 of the electric motor 70 to be coupled to an output shaft 76 of the gearbox 16 and to the rotor shaft 61 of the compressor 60, such that the rotation speed of the rotor shaft 61 depends on the respective rotation speeds of the output shafts 74, 76.

Figure 4:
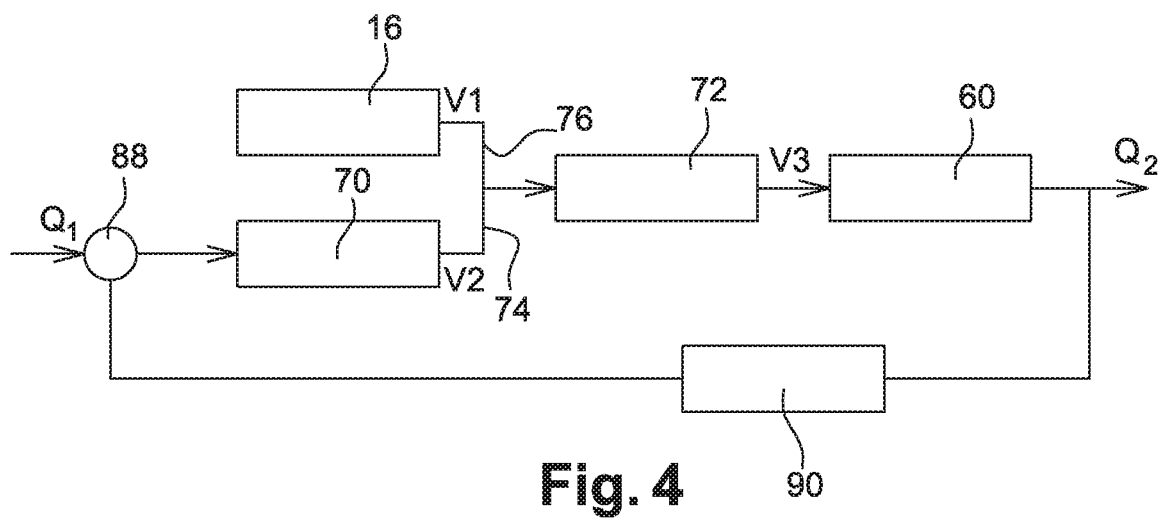
FIG. 4 is a block diagram showing the general architecture of the air supply means.
Figure 5:
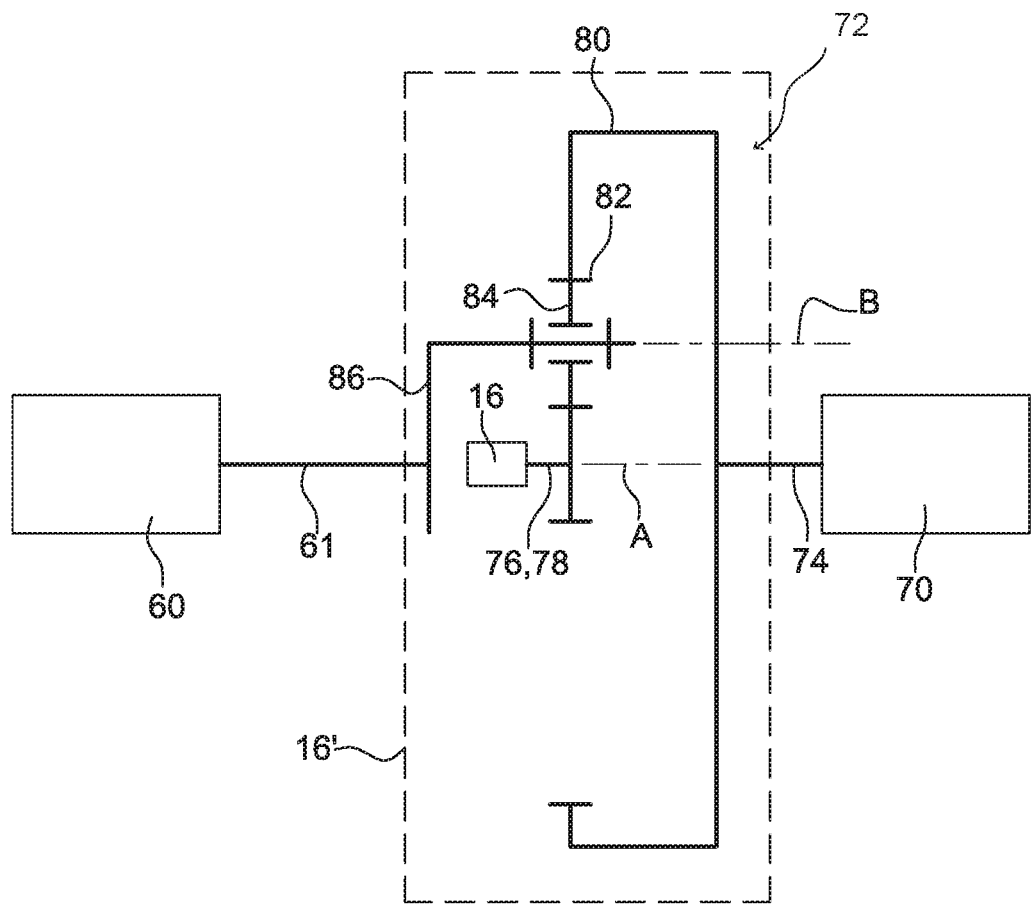
FIG. 5 is a highly schematic view showing mechanical differential coupling means of the air supply means.

FIG. 4 is a block diagram showing the operating principle of the control means according to the invention and FIG. 5 shows an embodiment of the mechanical differential 72.

In the embodiment of FIG. 5, the differential 72 comprises a sun gear shaft 78 having outer teeth, an outer ring 80 that extends around the sun gear shaft 78 and has inner teeth 82, and satellite gears 84 which are arranged between the sun gear shaft 78 and the ring 80 and are meshed with the teeth of the sun gear shaft and the ring. The sun gear shaft and the ring are free to rotate about the same axis A. The satellite gears are mounted so as to freely rotate about axes B parallel to the axis A and are supported by a satellite carrier 86, which itself is mounted so as to freely rotate about the axis A.

The sun gear shaft 78 is herein connected to the output shaft 76 of the gearbox 16 or is formed in one piece with this shaft. The ring 80 is connected to the shaft 74 or is formed in one piece with this shaft. The satellite carrier 86 is connected to the shaft 61 of the compressor 60.

The mechanical differential 72 can be mounted on the gearbox 16. By way of a variant, and as is schematically shown as dashed lines in FIG. 5, the differential 72 can be integrated in the gearbox 16'. Similarly, the electric motor 70 can be integrated in the gearbox 16 or mounted thereon.

The control means further comprise means for measuring the rotation speed V1 of the output shaft 76 and means 88 for controlling the rotation speed V2 of the shaft 74 of the electric motor 70 depending on a desired air flow Q1 for supplying said circuit. Preferably, the control means further comprise means for measuring the rotation speeds V2 and V3 of the shafts 74, 61, respectively. These measurement means can be sensors or probes, for example Hall effect sensors or probes. The means for measuring the speed of the electric motor shaft can be means for computing this speed using the motor frequency.

The rotation speed V3 of the compressor shaft 61 depends on the speeds V1 and V2. The control means 88 are configured so as to impose a direction of rotation on the shaft 74 of the electric motor 70 and a rotation speed V2 on this shaft, which are determined so that the compressor supplies the air flow Q1. The control means preferably comprise a flowmeter 90 for measuring the air flow Q2 that is actually injected into the air-conditioning circuit. The control means 88 are configured to control the direction of rotation and the speed V2 of the shaft 74 such that Q2=Q1.

By way of a variant, it is possible to provide control using only the compressor speed determined depending on the operating rule of the compressor, without involving a measurement of the flows.

As described above with reference to the prior art, the rotation speed V1 of the shaft 76 is proportional to the rotation speed of the LP body and depends on the phase of the turbine engine. The invention allows the speed V3 of the shaft 61 of the compressor 60 to be not solely dependent on the speed of the LP body. On the contrary, regardless of the speed of the LP body and of the shaft 76 of the gearbox 16, the electric motor 70 is controlled so that the delivered air flow Q2 is equal to the desired air flow Q1.

During operation, the electric motor can generate operating heat. This heat can be used to re-heat the bleed air before it is injected into the conditioning circuit. In a particular embodiment of the invention, the motor operates at a temperature of 200° C. and the bleed air circulates around the motor inside a coiled tube that surrounds the motor so as to re-heat the bleed air by 30-40° C.

The invention further relates to a method for supplying air to the air-conditioning circuit, which method comprises one or more of the following steps:

rotating the first shaft 74 in a direction opposite that of the second shaft 76, such that the rotation speed V3 of the rotor 61 is less than that of the second shaft V1, during at least one operating phase of the turboprop engine, such as upon aircraft take-off (see phases 1 and 2 in the following table);

rotating the first shaft 74 in one direction, while the rotation speed V1 of the second shaft is substantially zero, during at least one operating phase of the turboprop engine, such as when in the aircraft off mode or hotel mode (phase 4);

not rotating the first shaft 74, the rotation speed V1 of the second shaft 76 imposing a rotation speed on the rotor 61, during at least one operating phase of the turboprop engine, such as at idle power (phase 3).

The following table resumes the advantages of the invention compared with the prior art. The first two columns of the table relate to the considered operating phases of an aircraft and to the duration of each of these phases. The third column relates to the prior art and the next three columns relate to the invention.

| Aircraft operating phase (the final operating phase is on the ground in the OFF mode) | Operating phase duration | Prior art: Load compressor take-off on the PGB without an electric motor | Invention: | | |
|---|---|---|---|---|---|
| | | | Load compressor take-off on the PGB with an electric motor (corresponds to demand) | Electric motor take-off on the AGB by means of an electric generator | Electric motor operating mode |
| T/O (phase 1) | Less than 3 minutes | 400 kW | 50 kW | 30 kW* | Rotation of the motor shaft in the opposite direction to reduce the rotation speed of the compressor rotor |
| MCL + MCT (phase 2) | Depending on the purpose, from 30 minutes to several hours | 100 kW | 50 kW | 5 kW** | Rotation of the motor shaft in the opposite direction to reduce the rotation speed of the compressor rotor |
| FI/GI (phase 3) | Depending on the purpose, generally less than 30 minutes | 40 kW | 40 kW | 0 kW | Electric motor off |
| OFF (phase 4) | As required | not possible | 0 kW | 30 kW*** | Rotation of the motor shaft in the same direction to drive the compressor rotor |

*this power is intended to be supplied over a fairly short period (less than 3 minutes);
**only in this case, electric power has to be supplied at a continuous rating, but this remains a relatively low power, compare with the required 50 kW;
***this power is intended to be supplied when the aircraft is off and possibly connected to an external electricity source; it is a new operating mode that was not possible using the prior art.

In a particular case, without an electric motor, upon take-off (T/O) the load compressor rotates at 80,000 rpm. With the electric motor, 35,000 rpm are sufficient for the compressor and for the motor. For the regimes "Max Climb" MCL and "Max Continuous" MCT phases, there is a possibility of modulating as required. Mechanical and electrical take-off are possible by continuously rotating the electric motor, as per demand, in order to achieve the best energy efficiency (electrical take-off on the HP body and mechanical take-off on the LP body, for example). FI and GI correspond respectively to flight idle mode ("Flight Idle") and ground idle mode ("Ground Idle").

The conclusion from the above table is that it can be seen that the supply of electricity for this invention is limited and does not require excessive oversizing of the electricity generation capacities of the aircraft or of the engine. The peak demand for aircraft take-off can be supplied by batteries. If a compressor is used that is only driven by an electric motor, 50 kW needs to be continuously generated, which in this case requires increasing the electricity generation capacities of the aircraft or of the engines.

The invention makes it possible to conceive a shift in the point of dimensioning of the load compressor so as to minimise in-flight take-off. The load compressor is then smaller, i.e. less bulky and lighter.

Furthermore, in the event of a failure of the electric motor, the load compressor remains mechanically driven by the gearbox.

The invention claimed is:

1. An aircraft turboprop engine, comprising at least one low-pressure body and one high-pressure body, the low-pressure body driving a thrust propeller by a gearbox, the turboprop engine further comprising means for supplying air to an air-conditioning circuit of an aircraft cabin, said supply means comprising a load compressor, a rotor of which is coupled to said low-pressure body via said gearbox,
   wherein said supply means further comprise means for controlling a rotation speed of the rotor of said compressor, which means comprise:
   an electric motor; and
   a mechanical differential for coupling a first output shaft of said electric motor to a second output shaft of said gearbox and to said compressor rotor, such that the rotation speed of said rotor depends on the respective rotation speeds of said first and second output shafts.

2. The aircraft turboprop engine according to claim 1, wherein said mechanical differential is integrated in said gearbox.

3. The aircraft turboprop engine according to claim 2, wherein said electric motor is integrated in said gearbox or is mounted on said gearbox.

4. The aircraft turboprop engine according to claim 1, wherein said control means comprise means for measuring the rotation speed of said second output shaft and means for controlling the rotation speed of said first shaft depending on a desired air flow for supplying said circuit.

5. The aircraft turboprop engine according to claim 4, wherein said control means comprise means for measuring the rotation speed of said first output shaft.

6. The aircraft turboprop engine according to 1, wherein said differential comprises a central sun gear connected to said second output shaft or formed by said second output shaft, an outer ring that extends around the central sun gear and is connected to said first output shaft or formed by said first output shaft, and satellite gears that are respectively meshed with said central sun gear and said outer ring and that are supported by a satellite carrier connected to said rotor or forming said rotor.

7. A method for supplying air to an air-conditioning circuit of a cabin of an aircraft that is equipped with at least one turboprop engine according to claim 1, the method comprising at least one of the following steps:
   rotating said first shaft in a direction opposite that of said second shaft, such that the rotation speed of said rotor is less than that of said second shaft, during at least one operating phase of the turboprop engine;
   rotating said first shaft in one direction, while the rotation speed of said second shaft is substantially zero, during at least one operating phase of the turboprop engine; and
   not rotating said first shaft, the rotation speed of said second shaft imposing a rotation speed on said rotor, during at least one operating phase of the turboprop engine.

8. The method according to claim 7, wherein the step of rotating said first shaft in a direction opposite that of said second shaft is performed upon aircraft take-off.

9. The method according to claim 7, wherein the step of rotating said first shaft in one direction, while the rotation speed of said second shaft is substantially zero, is performed when the aircraft is in off mode or hotel mode.

10. The method according to claim 7, wherein the step of not rotating said first shaft, the rotation speed of said second shaft imposing a rotation speed on said rotor, is performed at idle power.

* * * * *